United States Patent
Lucas

(10) Patent No.: US 9,039,084 B2
(45) Date of Patent: *May 26, 2015

(54) GOLF CART PROSTATE SEAT

(76) Inventor: Eugene Daniel Lucas, Dunmore, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/573,219

(22) Filed: Aug. 31, 2012

(65) Prior Publication Data

US 2013/0020850 A1 Jan. 24, 2013

Related U.S. Application Data

(63) Continuation-in-part of application No. 12/320,158, filed on Apr. 9, 2009, now Pat. No. 8,113,583.

(51) Int. Cl.
| | |
|---|---|
| *A47C 15/00* | (2006.01) |
| *B60N 2/24* | (2006.01) |
| *B60N 2/02* | (2006.01) |
| *B60N 2/64* | (2006.01) |
| *A63B 55/08* | (2006.01) |

(52) U.S. Cl.
CPC .. *B60N 2/24* (2013.01); *B60N 2/02* (2013.01); *A63B 2055/081* (2013.01); *B60N 2/646* (2013.01); *B60N 2002/0288* (2013.01)

(58) Field of Classification Search
CPC .. B60N 2/24; B60N 2/646; B60N 2002/0288; B60N 2/02; A63B 2055/081
USPC ......... 297/232, 233, 248, 257, 452.41; 5/654, 5/655.3
See application file for complete search history.

(56) References Cited

U.S. PATENT DOCUMENTS

| | | | | |
|---|---|---|---|---|
| 1,468,072 | A * | 9/1923 | Ogle | 128/889 |
| 4,341,415 | A * | 7/1982 | Braun et al. | 296/64 |
| 4,403,806 | A * | 9/1983 | Stephen | 297/217.1 |
| 5,121,962 | A * | 6/1992 | Weber et al. | 297/214 |
| 5,144,705 | A * | 9/1992 | Rogers | 5/654 |
| 5,363,934 | A * | 11/1994 | Edmund et al. | 180/6.5 |
| 5,509,722 | A * | 4/1996 | Beroth | 297/452.4 |
| 5,984,411 | A * | 11/1999 | Galumbeck | 297/344.15 |
| 6,125,486 | A * | 10/2000 | Rabon | 5/654 |
| 6,578,854 | B2 * | 6/2003 | Wucherpfennig et al. | 180/330 |
| 7,367,493 | B1 * | 5/2008 | Lute et al. | 235/379 |
| 2006/0049676 | A1 * | 3/2006 | Hanson | 297/230.11 |
| 2007/0236074 | A1 * | 10/2007 | Rodriquez | 297/452.41 |

* cited by examiner

*Primary Examiner* — Milton Nelson, Jr.

(57) ABSTRACT

There is provided a moveable power seat slide device assembly comprising a movable seat cushion and seat rail including upper rails secured to the seat cushion and lower rails secured to the body of the golf cart, a motor for driving each movable seat and a current control circuit.

The prostate golf cart seat protects the prostate area from continuous bouncing. The seat has two 8 inch stationary end cushions. The center would consist of two 8 inch cushions moving along a rail which allows riders to automatically close the 7 inch seat gap to 3 inches from the stationary end cushion. The center air space between each rider and seat would have a depth 1½ inches.

1 Claim, 6 Drawing Sheets

FRONT VIEW SHOWING BOTH OF THE INSIDE SEAT CUSHIONS MOVED TO THE POSITION WITH THE LARGEST GAP, 7 INCHES

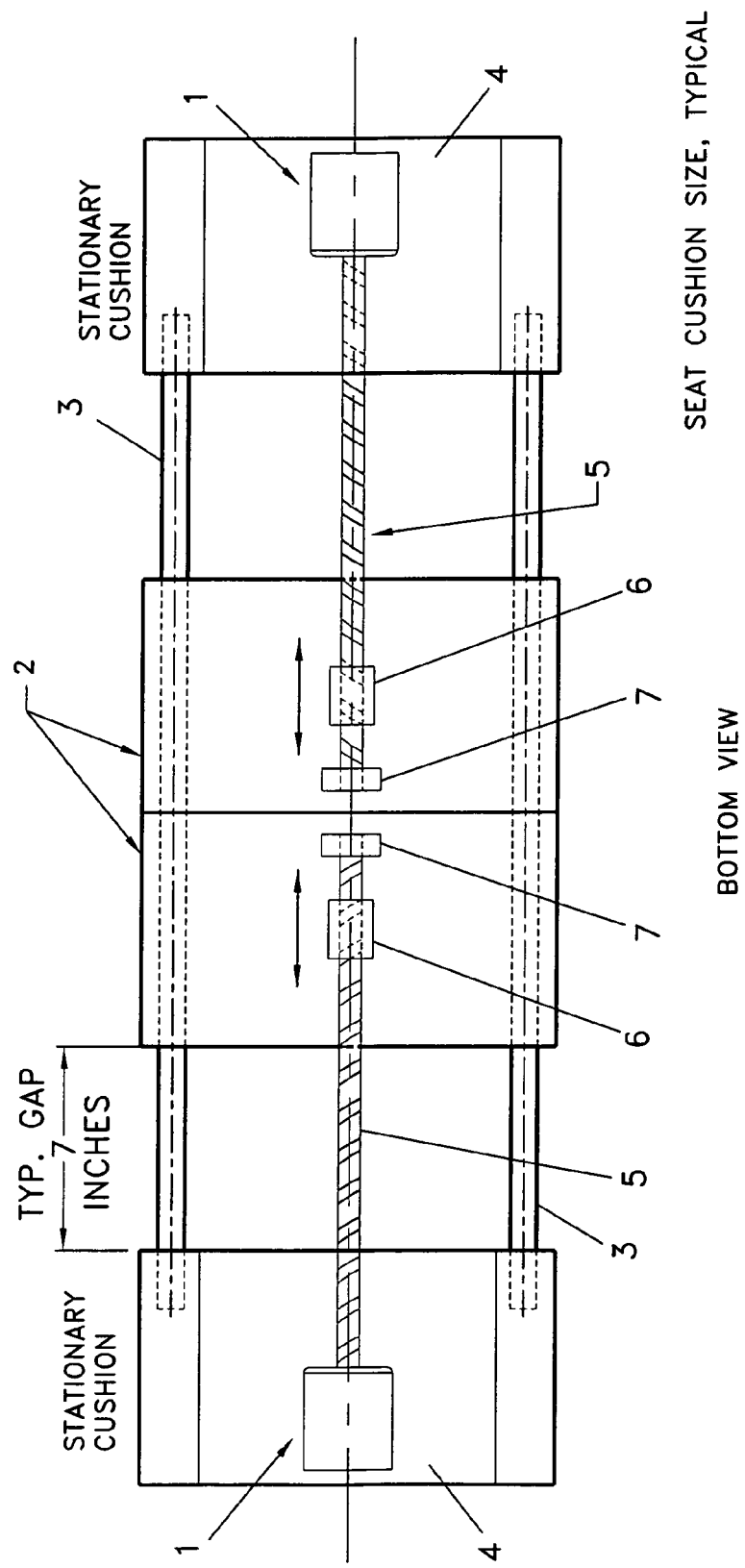

GOLF CART PROSTATE SEAT

RELATED APPLICATIONS

This application is a continuation-in-part of U.S. patent application Ser. No. 12/320,158 filed Apr. 9, 2009, now U.S. Pat. No. 8,113,583.

FIELD OF INVENTION

The prostate golf cart seat allows for the prostate to ride over a 1½ inch cushion of air rather than resting directly on the seat. Prior patents have dealt with adjustments of the seat length, seat width, arm dividers, seat back adjustments and the entire seat tilt adjustment. The prostate golf cart seat has 1½ inch seat cushions with a power control to laterally close each rider's seat cushion from 7 inches to 3 inches to adjust to each rider's individual comfort. As men age, their prostate begins to enlarge. The larger the prostate the more impact it will have on the golf cart seat.

The present invention is designed to eliminate the impact of the prostate on the golf cart seat.

BACKGROUND OF THE INVENTION

Golf carts without prostate protection are commonly used on all golf courses today. Continuous bumping and jarring of the prostate area during the ride over time may cause the prostate to enlarge.

SUMMARY OF THE INVENTION

The present invention eliminates the impact on the prostate by providing a 1½ inch air space between the seat and the prostate. This is achieved by the use of 1½ inch seat cushions. The movable power seat would utilize two 7 inch spaces with each individual rider having the ability to close each seat for better comfort up to 3 inches from the outside cushion.

BRIEF DESCRIPTION OF DRAWINGS

FIG. 6 is the bottom view the powered prostate golf cart seat;

DETAILED DESCRIPTION OF THE PROSTATE GOLF CART SEAT

Figure 1:
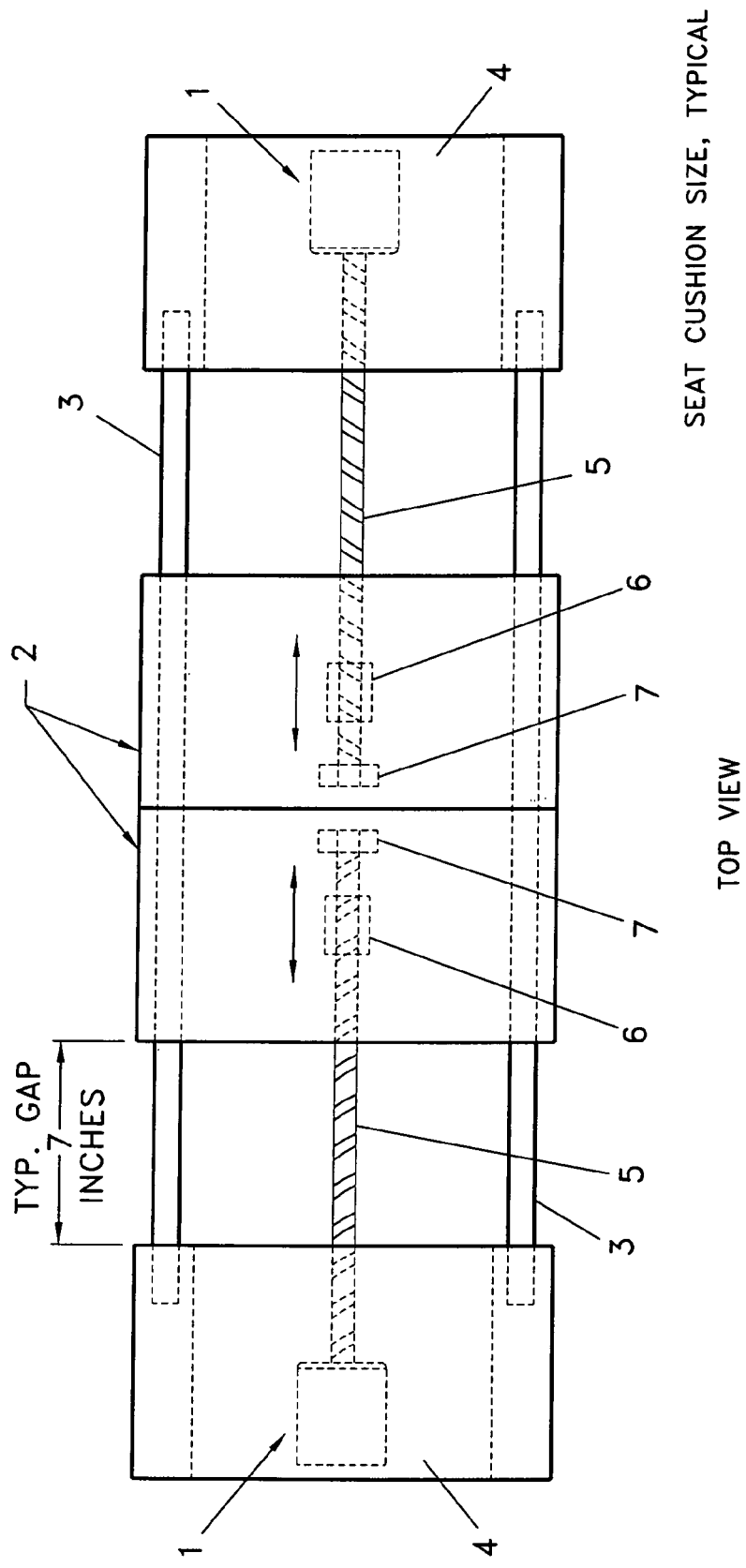
FIG. 1 shows the top view of the powered prostate golf cart seat with the lateral moving seat cushions shown in the position which allows for the largest adjusted space.
Figure 2:
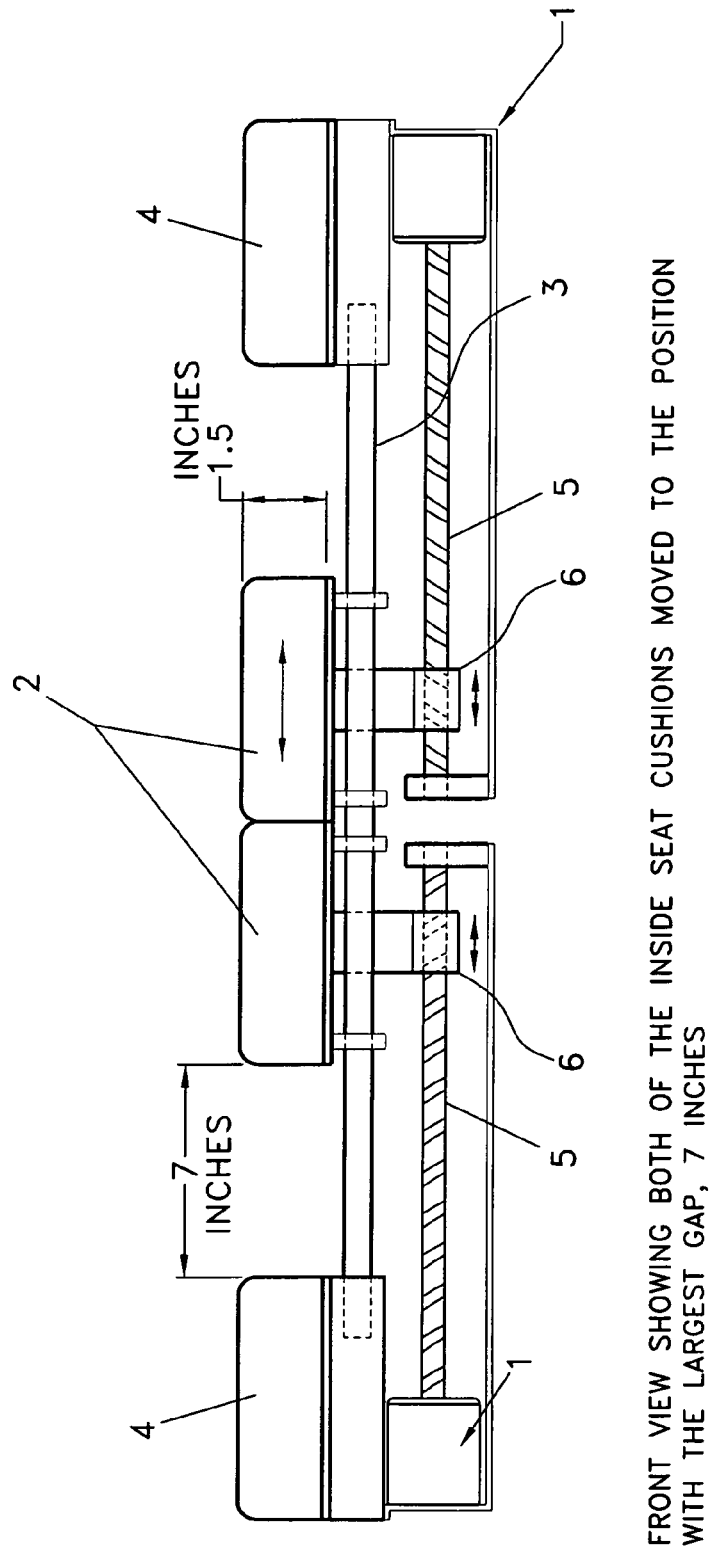
FIG. 2 shows the front view of the powered prostate golf cart seat with the lateral moving seat cushions shown in the position which allows for the largest adjusted space.
Figure 3:
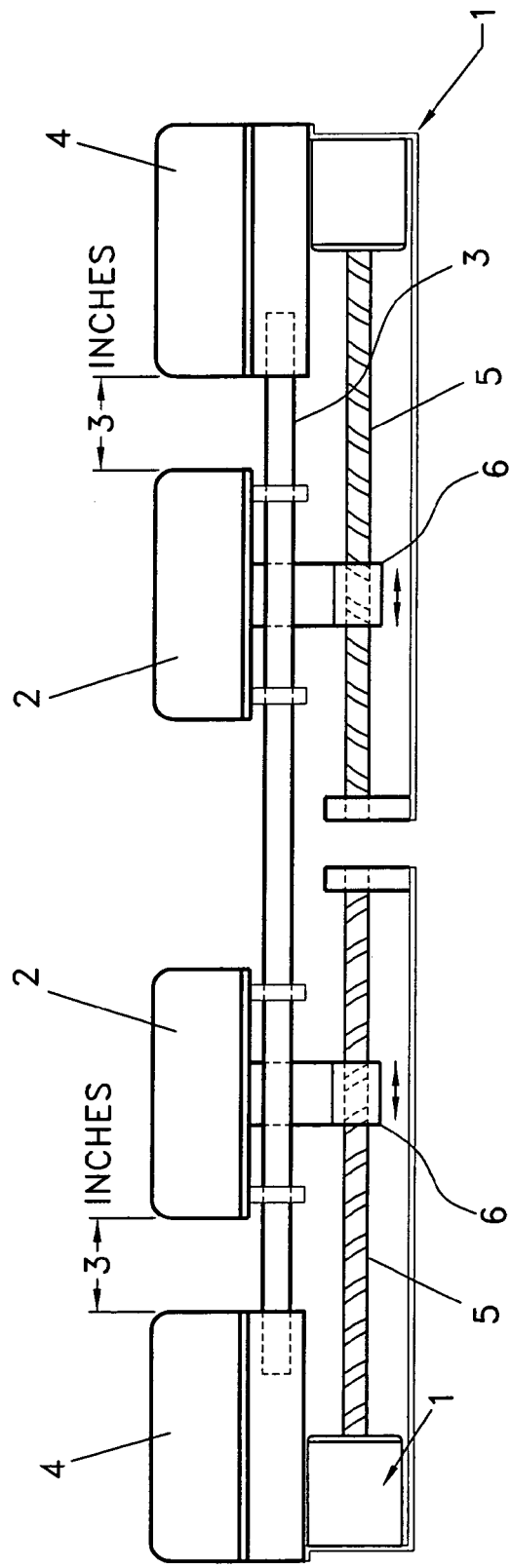
FIG. 3 shows the front view of the powered prostate golf cart seat with the lateral moving seat cushions shown in the position which allows for the smallest adjusted space.
Figure 4:
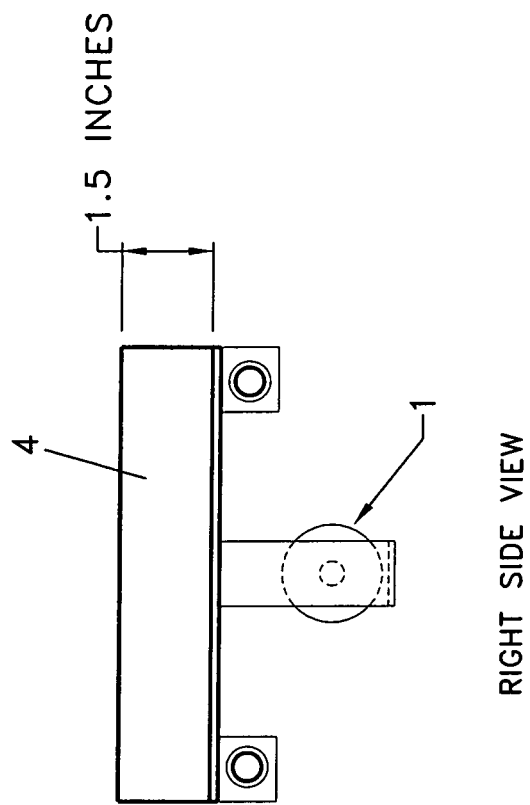
FIG. 4 is the right side view of the powered prostate golf cart seat showing cushion depth of 1½ inches.
Figure 5:
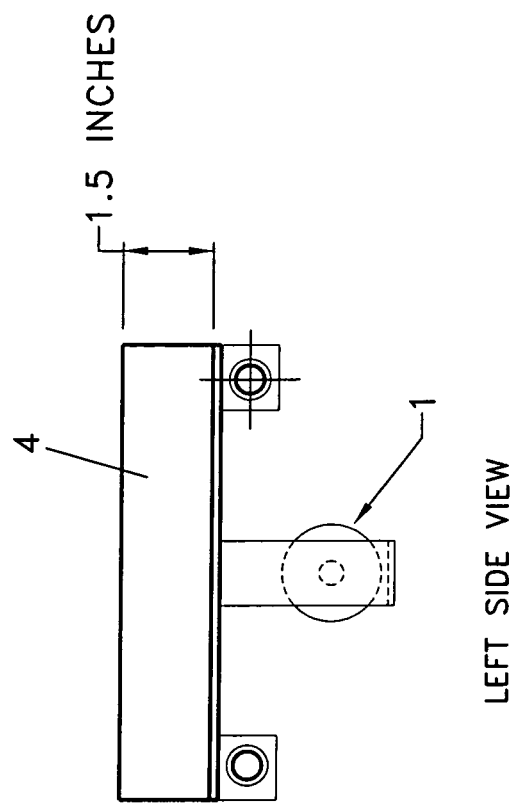
FIG. 5 is the left side view of the powered prostate golf cart seat showing cushion depth of 1½ inches.

The prostate golf cart seat consists of two (2) stationary 1½ inch thick stationary cushions 4 at each end of the golf cart seat with two (2) 1½ inch thick adjustable cushions 2 in the middle which move laterally by the use of a threaded shaft 5 connected to the motor 1 at one end and connected to a stationary block 7 at the other end whereby the seat moves laterally by the use of a threaded block 6 allowing the seat to open and close from 3 inches to 7 inches along a rail rail 3. Accordingly, two golfers may adjust the middle seat cushion for each individual's comfort by using a motor 1.

During the ride over the golf course, a great deal of bumping occurs over the prostate area. Conventional golf cart seats exert the rider's weight throughout the prostate area. Conventional golf cart seats do not protect the prostate during the duration of the ride. The prostate golf cart seat is designed to eliminate that impact. The center of the prostate golf cart seat consists of two (2) 8 inch seat cushions 2 which move laterally away from each other allowing for adjustment by two golfers by using individual motors. By providing powered movable seat cushions, the seat creates a 3 inch to 7 inch space in the middle of each golfer's seat thereby eliminating any pressure on the prostate. Each center seat cushion may be adjusted to close the 7 inch gap to 3 inches if desired by using a motor with similar elements or different materials, sizes and flexibility. The prostate powered golf seat may be made of metal, plastic or wood or a combination of these materials.

What is claimed is:

1. A prostate golf cart seat with a thickness of 1½ inches comprising:
   two outside 8 inch powered stationary seat cushions,
   each having an adjacent inside 8 inch powered movable seat cushion;
   power controls under the stationary and movable seat cushions;
   wherein the movable seat cushions ride on a rail allowing riders to adjust the movable seat cushions, by using the power controls under each stationary and movable seat cushion, from a distance of 7 inches to 3 inches from the outside stationary seats cushions;
   whereby the distance between each movable seat cushion and it's adjacent stationary seat cushion forms a gap that is adapted to provide a 1½ inch space when in use between the seat cushions and the rider's prostate, thereby eliminating bumping and jarring that occurs during a ride, whereby the inside movable seat cushions allow for adjustments to close the gap from 7 inches to 3 inches if desired with the power controls.

* * * * *